United States Patent
Ranjan et al.

(10) Patent No.: US 11,403,134 B2
(45) Date of Patent: Aug. 2, 2022

(54) PRIORITIZING MIGRATION OF DATA ASSOCIATED WITH A STATEFUL APPLICATION BASED ON DATA ACCESS PATTERNS

(71) Applicant: Hewlett Packard Enterprise Development LP, Houston, TX (US)

(72) Inventors: Jyoti Ranjan, Bangalore Karnataka (IN); Ajay Kumar Bajaj, Bangalore Kamataka (IN); Abhishek Kumar, Bangalore Kamataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 237 days.

(21) Appl. No.: 16/779,352

(22) Filed: Jan. 31, 2020

(65) Prior Publication Data
US 2021/0240522 A1  Aug. 5, 2021

(51) Int. Cl.
| | |
|---|---|
| *G06F 9/455* | (2018.01) |
| *G06F 9/48* | (2006.01) |
| *G06F 3/06* | (2006.01) |

(52) U.S. Cl.
CPC .......... *G06F 9/4856* (2013.01); *G06F 3/0604* (2013.01); *G06F 3/067* (2013.01); *G06F 3/0647* (2013.01); *G06F 3/0665* (2013.01); *G06F 9/45558* (2013.01); *G06F 2009/4557* (2013.01); *G06F 2009/45562* (2013.01); *G06F 2009/45595* (2013.01)

(58) Field of Classification Search
CPC .................................................... G06F 9/4856
USPC .............................................................. 718/1
See application file for complete search history.

(56) References Cited

U.S. PATENT DOCUMENTS

| | | | |
|---|---|---|---|
| 9,977,596 B2* | 5/2018 | Hunter | G06F 3/067 |
| 2005/0216591 A1* | 9/2005 | Sato | G06F 3/0613 |
| | | | 709/226 |

(Continued)

OTHER PUBLICATIONS

AWS Prescriptive Guidance Migration Tools Guide, Amazon Web Services, Aug. 2019, 18 pages.

(Continued)

*Primary Examiner* — Mehran Kamran
(74) *Attorney, Agent, or Firm* — Jaffery Watson Mendonsa & Hamilton

(57) ABSTRACT

Example implementations relate to migration of a stateful application from a source computing environment to a destination virtualized computing environment by prioritizing migration of data of the application based on a priority map created based on data usage patterns. An instance of the application is installed within the destination environment. The priority map includes priorities for chunks of the data based on historical data access patterns. The data is migrated from a source volume of the source environment to a destination volume of the destination environment on a chunk-by-chunk basis by performing a background data migration process based on the priority map. Usage of the application concurrent with the data migration process is facilitated by abstracting a location of data being operated upon by the application by maintaining migration status for the chunks. The priority map is periodically updated based on observed data access patterns post application migration.

23 Claims, 10 Drawing Sheets

(56) References Cited

U.S. PATENT DOCUMENTS

| | | | |
|---|---|---|---|
| 2009/0043958 A1* | 2/2009 | Kaneda | G06F 3/062 711/112 |
| 2010/0070474 A1* | 3/2010 | Lad | G06F 16/13 707/624 |
| 2011/0099318 A1* | 4/2011 | Hudzia | G06F 9/5088 711/6 |
| 2011/0153697 A1* | 6/2011 | Nickolov | H04L 67/10 707/827 |
| 2012/0110288 A1* | 5/2012 | Lehr | G06F 3/0608 711/162 |
| 2012/0246659 A1* | 9/2012 | de Lira Garza | G06F 8/65 718/103 |
| 2013/0124465 A1* | 5/2013 | Pingel | G06F 3/0604 707/610 |
| 2013/0132967 A1* | 5/2013 | Soundararajan | H04L 67/06 718/104 |
| 2013/0204963 A1* | 8/2013 | Boss | G06F 3/061 709/217 |
| 2013/0247050 A1* | 9/2013 | Watanabe | G06F 11/3433 718/101 |
| 2013/0275986 A1* | 10/2013 | Yen | G06F 3/061 718/103 |
| 2014/0250281 A1* | 9/2014 | Rao | G06F 12/0223 711/156 |
| 2015/0149605 A1* | 5/2015 | de la Iglesia | G06F 3/0647 709/223 |
| 2015/0213032 A1* | 7/2015 | Powell | G06F 3/067 707/827 |
| 2016/0041996 A1* | 2/2016 | Prinz, III | G06F 16/119 707/827 |
| 2016/0062689 A1* | 3/2016 | Cherubini | G06F 3/0643 711/159 |
| 2016/0092119 A1* | 3/2016 | Butterworth | G06F 16/119 711/165 |
| 2017/0339225 A1* | 11/2017 | Vasetsky | H04L 67/1097 |
| 2017/0357645 A1 | 12/2017 | Kritchko et al. | |
| 2017/0371887 A1* | 12/2017 | Balasubramanian | G06F 16/119 |
| 2018/0004560 A1* | 1/2018 | Shankar | G06F 9/4856 |
| 2018/0006963 A1* | 1/2018 | Brouwer | H04L 47/801 |
| 2018/0052620 A1* | 2/2018 | Driesen | G06F 3/067 |
| 2018/0213036 A1* | 7/2018 | Vasetsky | H04L 41/0896 |
| 2018/0217765 A1* | 8/2018 | Hadas | G06F 9/45558 |
| 2018/0246659 A1* | 8/2018 | Agarwal | G06F 3/0605 |
| 2019/0220214 A1* | 7/2019 | Mio | G06F 3/0658 |
| 2019/0235918 A1* | 8/2019 | Liu | G06F 3/0647 |
| 2019/0356729 A1* | 11/2019 | Bivens | H04L 67/1002 |
| 2020/0004723 A1* | 1/2020 | Ben Dayan | G06F 16/13 |
| 2020/0042618 A1* | 2/2020 | Mukku | G06F 3/0631 |
| 2020/0073802 A1* | 3/2020 | Pradhan | G06F 11/1469 |
| 2020/0326871 A1* | 10/2020 | Wu | G06F 3/0679 |
| 2020/0326876 A1* | 10/2020 | Tian | G06F 9/44 |
| 2020/0401546 A1* | 12/2020 | Mehta | G06F 11/2097 |
| 2021/0243278 A1* | 8/2021 | Sugisono | H04L 67/34 |

OTHER PUBLICATIONS

Bugwadia, Jim, "Containerizing Stateful Applications", InfoWorld, Aug. 12, 2016, 14 pages.

\* cited by examiner

310

| Chunk ID | Priority | Start Block | End Block | Migrated |
|---|---|---|---|---|
| 1 | 25 | 0 | 999 | N |
| 2 | 85 | 1000 | 1999 | N |
| 3 | 30 | 2000 | 2999 | N |
| 4 | 75 | 3000 | 3999 | N |
| 5 | 50 | 4000 | 4999 | N |
| 6 | 80 | 5000 | 5999 | N |
| 7 | 95 | 6000 | 6999 | N |
| 8 | 55 | 7000 | 7999 | N |
| 9 | 10 | 8000 | 8999 | N |
| 10 | 43 | 9000 | 9999 | N |

| Chunk ID | Priority | Start Block | End Block | Migrated |
|---|---|---|---|---|
| 1 | 25 | 0 | 999 | N |
| 2 | 85 | 1000 | 1999 | Y |
| 3 | 30 | 2000 | 2999 | N |
| 4 | 75 | 3000 | 3999 | Y |
| 5 | 50 | 4000 | 4999 | N |
| 6 | 90 | 5000 | 5999 | Y |
| 7 | 95 | 6000 | 6999 | Y |
| 8 | 55 | 7000 | 7999 | N |
| 9 | 10 | 8000 | 8999 | N |
| 10 | 11 | 9000 | 9999 | N |

*FIG. 3B*

PRIORITIZING MIGRATION OF DATA ASSOCIATED WITH A STATEFUL APPLICATION BASED ON DATA ACCESS PATTERNS

BACKGROUND

Cloud computing has significantly affected the way Information Technology (IT) infrastructure is being consumed. With the help of virtualization technology, it is possible to deploy variety of virtual infrastructure ranging from public cloud environments to on-premise data centers based on native hardware. While during the last decade or so, virtual machines (VMs) have been a common mechanism to deploy application infrastructure, the use of containerized applications is rapidly becoming the preferred choice for deployment of application workloads.

Meanwhile, as a result of the ability on the part of public clouds to deploy application workload across data centers spread across multiple geographies, provide a rich set of features, and serve user needs directly without going through cumbersome IT department processes as well as the emergence of hybrid cloud technologies, many enterprise IT departments are no longer focused on pure on-premise or pure cloud-based infrastructure implementations. Instead enterprise IT departments now seek to achieve the right mix of both worlds so as to arrive at their desired tradeoffs among cost, agility and security. These and other factors are resulting in many on-premise applications being migrated to the public cloud. For example, applications running in private data centers are being migrated to private or public cloud environments in the form of virtualized applications or containerized applications.

BRIEF DESCRIPTION OF THE DRAWINGS

Embodiments described here are illustrated by way of example, and not by way of limitation, in the figures of the accompanying drawings in which like reference numerals refer to similar elements.

FIG. 3A illustrates an initial Data Migration Priority Map (DMPM) in accordance with an embodiment.

FIG. 3B illustrates a DMPM after data migration for a stateful application has commenced and the DMPM has been updated to reflect observed data usage patterns in accordance with an embodiment.

DETAILED DESCRIPTION

Figure 1:
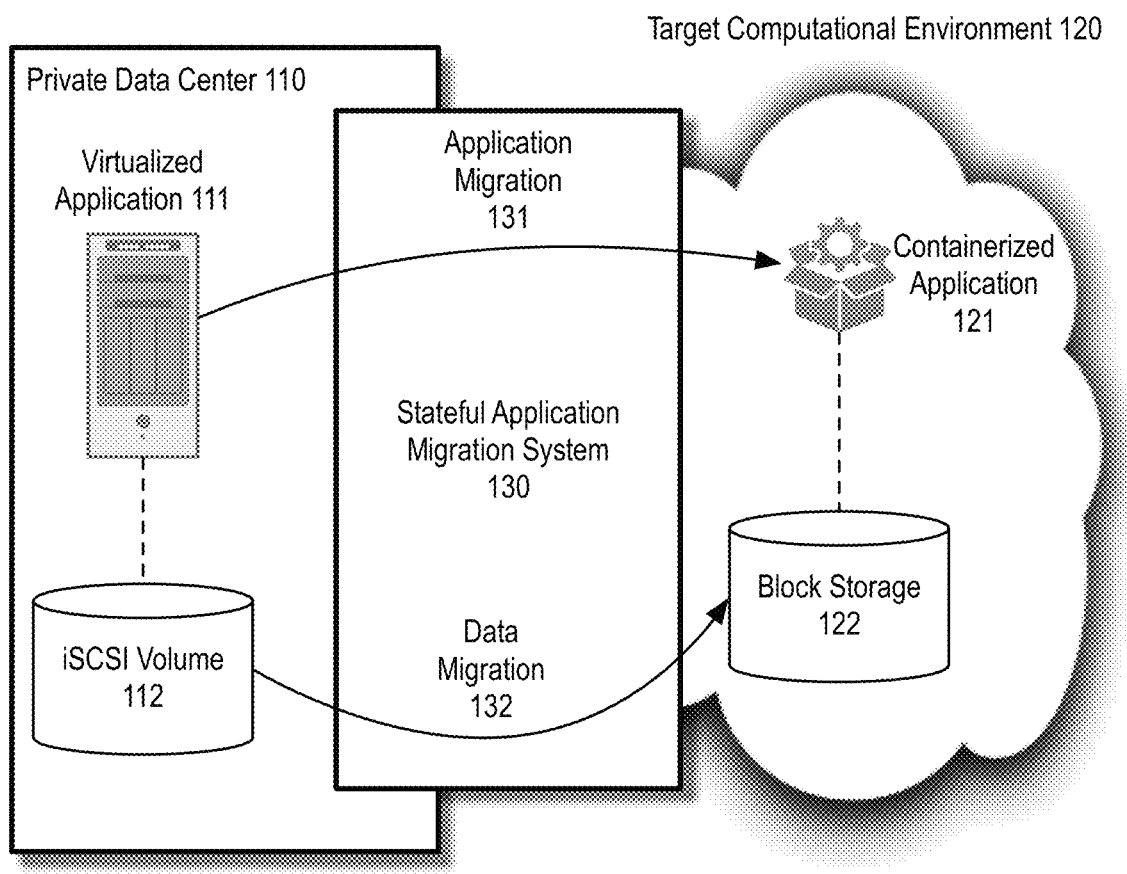
FIG. 1 is a high-level block diagram conceptually illustrating migration of a stateful application from a private data center to a public cloud in accordance with an embodiment.

Embodiments described herein are generally directed to migration of a stateful application from one computing environment to another without downtime by prioritizing migration of the data of the stateful application in a prioritized manner based on data usage patterns. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

There are two general types of applications: stateless and stateful. A stateless application (e.g., a web server) does not save client data generated from one session for use in a subsequent session with that client. In contrast, a stateful application (e.g., a customer relationship management (CRM) application or a database application) saves data from a client session and that data is available the next time the client makes a request. It is easy to mobilize stateless application as they are not influenced by data gravity. Data gravity generally refers to the ability of bodies of data to attract applications, services and other data. As stateless applications are not reliant on data, they can be easily moved across servers, across multiple availability zones, and/or across data centers.

The same is not true for stateful applications, which due to their reliance on data tend to be collocated with their respective data sources, which, depending on the application and the amount of data generated over a period of time, can run into the terabytes or petabytes. As such, due to the reliance on data, migrating a stateful applications from one computing environment (e.g., a data center) to another computing environment (e.g., a virtualized computing environment, such as a VM-based environment or a container-based environment) is a challenging task. For example, migrating the data associated with a stateful application can take from hours to days to months depending upon the amount of data involved. That is, the higher data gravity, the longer time it takes to migrate a stateful application. Traditional cloud migration approaches result in the migrated stateful application being inaccessible for a good deal of time until the data upon which the stateful application relies has been fully migrated.

Embodiments described herein seek to reduce the downtime associated with the migration of stateful applications and their associated data by making the stateful application in the target computing environment as soon as its compute instance has been successfully migrated and without waiting for all of the associated data to be migrated.

According to one embodiment, a stateful application migration system implements a mechanism for defying data gravity by prioritizing the migration of the data for a stateful application in the background as the migrated stateful application is operational and in use in the target computing environment. For example, the migration of the data of the stateful application may be migrated in a prioritized fashion based on historical data access patterns combined with observed data access patterns during usage of the migrated stateful application. In this manner, there is essentially no downtime as the migrated stateful application is immediately available to users in the target computing environment as the data is migrated from the source data volume to a data volume in the target computing environment in the background in a prioritized manner that attempts to identify and move chunks of data that are most likely to be accessed before those having a lower likelihood of use.

While various examples are described herein with reference to migration of a stateful application in a form of a virtualized application running on a VM from one data center to another in a form of a containerized application running within a container of a Kubernetes as a Service (KaaS) platform, embodiments are equally applicable to other virtualized computing environments as the source and/or destination and other forms of virtualized applications as the source and/or destination. As such, those skilled in the art will appreciate based on the disclosure contained herein that embodiments of the stateful application migration system can support heterogeneity and/or homogeneity in relation to stateful application migration. For example, migration can be facilitated from a VM-based application to a container-based application, from a VM-based application to a VM-based application, or from a container-based application to a container-based application. Additionally, embodiments provide hybrid cloud support by allowing users to choose the target computing environment to which the stateful application being migrated as another data center located in another geographical region or as a public cloud provider that will host the application. Also, the user may, to save time and/or save cost, for example, migrate the stateful application from one public cloud to another public cloud.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrase "computational environment" generally refers to an environment in which an application can be run. For example, an application can be run directly on physical infrastructure resources (e.g., servers) or a virtualized form of an application can be run on virtualized infrastructure resources (e.g., VMs) or within containers. Non-limiting examples of a computational environment include a public or private data center and a virtualized computational environment (e.g., a VM-based environment or a container-based environment) provided in the form of a public or private cloud.

As used herein the phrases "dummy volume" or "dummy storage volume" generally refers to storage that is not intended to represent a source of data for a particular application. For example, in the context of various embodiments described herein, a zero-sized storage volume is created within the target computing environment to which an application has been migrated and is presented to the application so as to allow a dummy volume data path driver associated with the dummy storage volume to intercept read and write requests originated by the application so they can be handled in accordance with the migration status of the chunks of data requested. A non-limiting example of the type of storage that might be used as a dummy volume in the context of various embodiments includes block storage provided in the form of the Amazon Elastic Block Store (EBS).

The phrase "stateful application" generally refers to an application that persists state information or data to a data store. Non-limiting examples of stateful applications include customer relationship management (CRM) applications and database applications (e.g., accounting systems, reservation systems, transaction processing systems or other applications that involve storing information to and/or retrieving information from a database).

FIG. 1 is a high-level block diagram conceptually illustrating migration of a stateful application from a private data center 110 to a target computational environment 120 (e.g., a public cloud) in accordance with an embodiment. In the context of the present example, a stateful application in the form of a virtualized application 111 running on a virtual machine within the private data center 110 is to be migrated by stateful application migration system 130 to a target computational environment 120 in the form of a containerized application running within a container. A non-limiting example of the target computational environment 120 includes a container orchestration service (e.g., a managed Kubernetes service).

Figure 2:
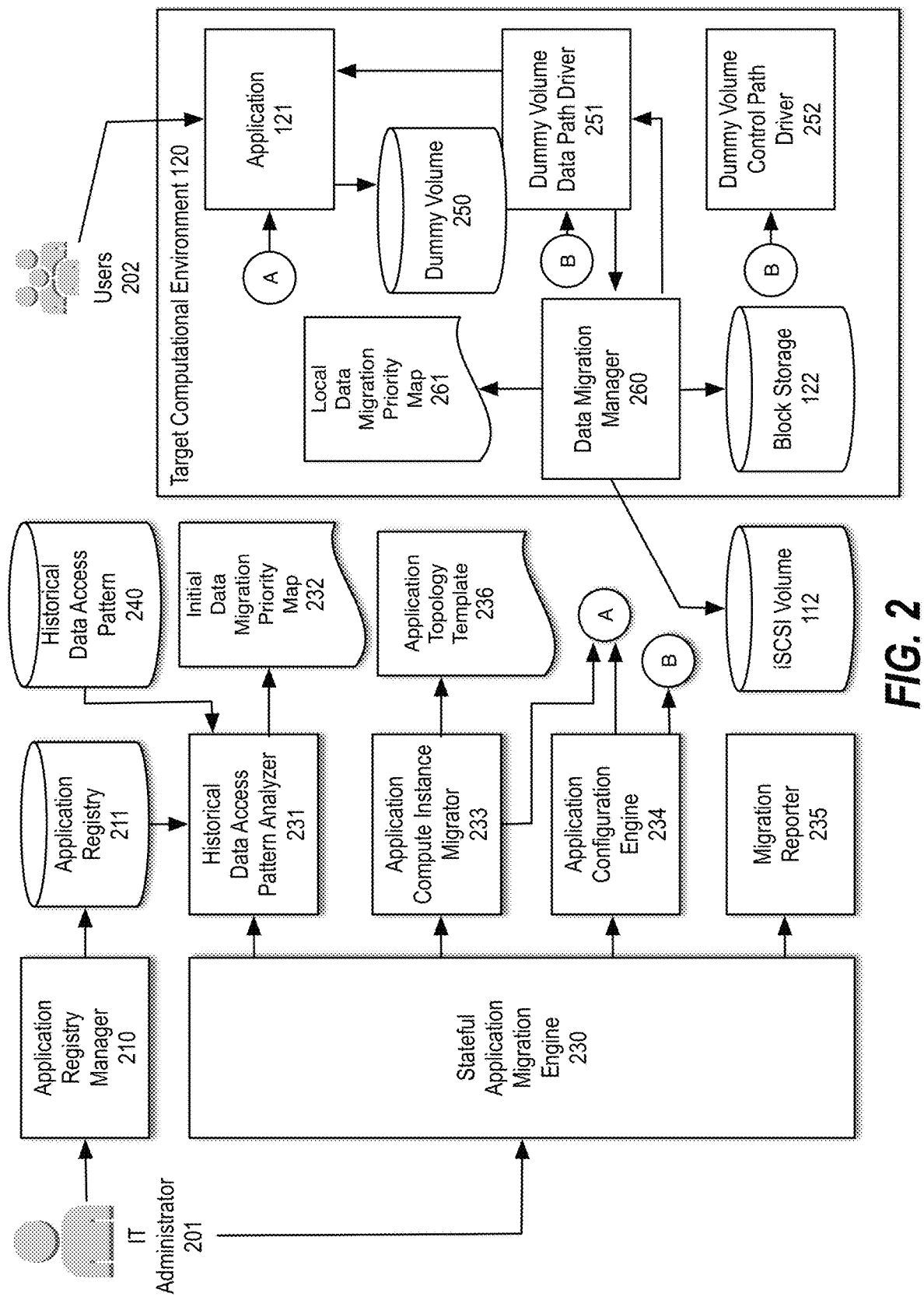
FIG. 2 is a block diagram illustrating various components of a stateful application migration system in accordance with an embodiment.

In the context of the present example, stateful application migration system 130 is shown overlapping a portion of the private data center 110 and a portion of the target computational environment 120 to indicate in accordance with various embodiments some components of the stateful application migration system 130 are implemented within the source computational environment and some are implemented within the target (destination) computational environment as explained further below with reference to FIG. 2.

In its legacy form, while running within the private data center 110, the virtualized application 111 relies on source data stored within a local storage volume (e.g., an Internet Small Computer Systems Interface (iSCSI) volume 112). In its intended migrated form, after the virtualized application 111 has been migrated into containerized application 121 running within the target computational environment 120 (for which a cluster, e.g., an Amazon Web Services (AWS) Elastic Kubernetes Service (EKS) cluster is assumed to have already been created) and after the data from the iSCSI volume has been fully migrated to the target computational environment 120, the source of data for the containerized application 121 will be the block storage 122 (a non-limiting example of which is AWS EBS).

As those skilled in the art will appreciate, migration 131 of the compute instance of a stateful application can be performed in a matter of minutes. As such, the typical reason for downtime when performing migration of a stateful application from one place to another is waiting for the migration 132 of the data relied upon by the stateful application to be completed, which depending upon the amount of data could be days, weeks or even months. Embodiments described herein, seek to facilitate immediate accessibility of the migrated application by end users as soon as the compute instance of the stateful application has been migrated. That is, in the context of the present example, as soon as the containerized application 121 has been launched. As described further below, immediate usage of the migrated instance of the stateful application is facilitated by abstracting from the application the current location (e.g., the source computational environment or the target computational environment) of the chunks of data as they are being migrated in accordance with a background data migration process performed by the stateful application migration system 130 that prioritizes the migration of chunks of data that are the most likely to be accessed by the end users. In this manner, the migrated stateful application is immediately available for use without waiting for completion of data migration and the migration experience associated with migrating a stateful application can be made more similar to that of the migration experience associated with the migration of a stateless application.

FIG. 2 is a block diagram illustrating various components of a stateful application migration system (e.g. stateful application migration system 130) in accordance with an embodiment. According to one embodiment, some components of the system are implemented within the target (destination) computational environment (e.g., target computational environment 120) and some (those shown outside of the target computational environment 120) are implemented in the source computational environment (e.g., the private data center 110). In the context of the present example, the components of the system implemented within the source computational environment includes an application registry manager 210, an application registry 211, a stateful application migration engine 230, a historical data access pattern analyzer 321, a historical data access pattern data store 240, an initial Data Migration Priority Map (DMPM) 232, an application compute instance migrator 233, an application topology template 236, an application configuration engine 234, and a migration reporter 235. In the context of the present example, the components of the system implemented within the target computational environment 120 include a data migration manger 260, a local DMPM 261, a dummy volume 250, a dummy volume data path driver 251 and a dummy volume control path driver 252.

According to one embodiment, an IT administrator 201 uses the application registry manager 210 to register information regarding the source application to be migrated (e.g., virtualized application 111) the accessibility of the destination application (e.g., application 121), and data migration attributes. For example, the application registry manager may be operable to prompt the IT administrator 210 for and receive information regarding the source application name, volume attributes (e.g., size, type, etc.) of the source data volume (e.g., iSCSI volume 112), destination application attributes, an instance type (e.g., VM or container) of the destination application instance, an application programming interface (API) endpoint of the target computational environment 120 to create the destination application instance, a volume type of the target data volume (e.g., block storage 122), chunk size, information regarding historical data access patterns (e.g., historical frequency of use (spatial and/or temporal) of each of the data blocks of the source data volume), and any preferences in relation to prioritization of some portion of the source data. The information received by the application registry manager 210 may be persisted to the application registry 211.

The predefined chunk size configured by the IT administrator may be informed by various characteristics, including the nature of the source application and the usage model of the source application. For example, those skilled in the art will appreciate a relatively small chunk size may be preferable for use in connection with a high input/output (I/O) intensive application (e.g., a banking application), exhibiting frequent but small transactions in order to ensure low latency availability of requested data, whereas a relatively large chunk size may be desirable for a less I/O intensive application (e.g., a download or backup application) that has fewer, but larger transactions. Non-limiting examples of the various characteristics include characteristics of the source application (e.g., input/output (I/O) operations per second (IOPS), megabytes per second (MBPS), available network bandwidth between the source computational environment and the target computational environment, a desired size of the priority maps (e.g., the initial DMPM 232 and local DMPM 261) and historical usage behavior of end users interacting with the source application. According to one embodiment, information regarding one or more of the various characteristics may be observed and captured over time (e.g., 30 to 90 days) prior to initiating the application migration process. For example, the IOPS, MBPS, average size of I/O operations, I/O latency, and the like may be observed and recorded to the historical data access pattern data store 240 to be used in connection with the historical data access pattern analysis described further below.

The historical data access pattern analyzer 231 may be used to create the initial DMPM 232, which represents the initial migration priorities assigned to the chunks of the source data volume. According to one embodiment, the historical data access pattern analyzer 231, divides the source data volume into a number of chunks (e.g., one or more data blocks) based on the predefined chunk size specified by the IT administrator 201 and the size of the source data volume. The historical data access pattern analyzer 231 may also rank/prioritize each chunk of the source data volume based on an analysis of information regarding the historical data access pattern associated with the source application, for example, as observed over time and persisted to the historical data access pattern data store 240. An example of the initial DMPM 232 is described below with reference to FIG. 3A.

In one embodiment, the application compute instance migrator 233 is operable to create an infrastructure topology template (e.g., application topology template 236) in accordance with the nature of the target application instance. In the context of the present example, the application compute instance migrator 233 is also responsible for causing the instance of the application 121 to be created within the target computational environment 120 and precluding subsequent interactions with the source application, for example, by setting the source application in freeze mode.

Turning now to the application configuration engine 234, in one embodiment, it is responsible for ensuring the migration ecosystem is set up properly including performing data path configuration and control path configuration for the application 121 to cause the application 121 to issue I/O requests to the dummy volume 250 so they can be redirected via the dummy volume data path driver 251 for handling by the data migration manger 260 based on the migration status of the chunk within which the data associated with the I/O request resides. For example, the application configuration engine 234 may start the dummy volume data path driver 251 and the dummy volume control path driver 252 for the dummy volume 250 and cause the dummy volume 250 to be presented as a block device to the application 121.

In one embodiment, the dummy volume 250 is a zero-sized volume that is presented to the application 121 as a block device, but which is not intended to store any data on behalf of the application 121. Instead, in various embodiments, during background data migration processing and until the source data relied upon by the application 121 has been completely migrated to the block storage 122, the dummy volume 250 acts as a proxy between the application 121 and the data migration manger 260 as described in further detail below.

According to one embodiment, the dummy volume control path driver 252 configures containers running in Kubernetes eco-system to be associated with the dummy volume 250 so that it can be presented as a block device to the application 121.

In the context of the present example, the dummy volume data path driver 251 generally represents a gateway between data requests issued by users 202 and the system's ability to serve the live requests. According to one embodiment, the dummy volume data path driver 251 is a user mode driver running as a daemon container in the target computational environment 120 that may serve user requests until the data migration process has been completed and after the data migration process has been completed the live requests are redirected to the EBS and the dummy volume 250, the dummy volume data path driver 251, the dummy volume control path driver 252 and the data migration manager 260 are removed.

In one embodiment, so long as data migration is being performed, the dummy volume data path driver 251 interacts with the data migration manager 260 to process I/O requests (e.g., read requests or write requests) made by the application 121. For example, processing of read requests may involve requesting a set of blocks from the data migration manager 260 and returning them to the application 121, whereas processing of write requests may involve providing a set of blocks that are to be written to the block storage 122 to the data migration manger 260. In one embodiment, the dummy volume data path driver 251 abstracts the type of volume of the source data volume from the application 121 and supports data being accesses by the application 121 as if locally stored on a block volume by providing storage protocol translation when the source volume uses a different storage protocol.

Referring now to the data migration manager 260, in one embodiment, it is responsible for performing data migration and works in collaboration with the dummy volume data path driver 251. According to one embodiment the data migration manger 260 is implemented as a daemon process running in the background that migrates the data relied upon by the application 121 from the iSCSI volume 112 to the block storage 122 on a chunk-by-chunk basis in accordance with the chunk priorities specified by the local DMPM 261. As explained further below, the local DMPM 261 starts off with the initial migration priorities assigned to the chunks of the source data volume by the historical data access pattern analyzer, but the priority values may be dynamically modified over time as a result of the data migration manager 260 identifying a new emerging data access pattern based on observations of the user data access patterns (e.g., real-time interactions by the users 202 with the application 121) during operation of the application 121 in the target computational environment 120. An example of the local DMPM 232 is described below with reference to FIG. 3B.

Returning to the data migration manager 260, in the context of the present example, it is also responsible for providing data requested by the dummy volume data path driver 251. As the data upon which the application 121 is dependent is being migrated in the background as the application 121 is being actively used by users 202, there are three general scenarios that may be represented by a read request from the dummy volume data path driver 251 for a set of blocks: T 1. The chunk associated with the set of requested blocks has already been migrated and therefore is stored locally in the block storage 122. In this case, the data migration manger 260 may read the set of requested blocks from the block storage 122 and return it.
2. The chunk at issue is currently being migrated. In this case, the data migration manger 260 may wait for the migration of the chunk to be completed and when the migration of the chunk has been completed the requested data can be read from the block storage 122 and returned to the dummy volume data path driver 251. This scenario may cause some latency, but it is expected the latency will be in an acceptable range as the migration is already underway.
3. The chunk at issue has not been migrated and therefore remains in the source data volume in the source data center. In this case, in one embodiment, the priority of the chunk at issue can be raised so as to trigger initiation of its migration on demand. Then, upon completion of the migration of the chunk at issue, the requested data can be served from the cache first and then it can be flushed to the block storage 122, thereby ensuring there is no loss of data, for example, in the event of an intervening power failure.

According to one embodiment, the migration reporter 235 is responsible for reporting various migration statistics. For example, the migration reporter 235 may provide the IT administrator 201 with information including, but not limited to, the amount of data migrated, the source volume size, the destination volume size, which might have changed due to addition of data, the amount of time taken to perform the data migration, the number of live requests served during migration with associated latency data, and the like.

In one embodiment, the various data stores described herein may be in-memory data structures, files, databases or database tables. For example, the application registry 211 and the historical data access pattern data store 240 may each represent a database table within a relational database (not shown). Alternatively, these various datastores may represent individual disk files. Those skilled in the art appreciate the datastores described herein may be subdivided into smaller collections of a greater number of datastores of related data or aggregated into larger collections of a lesser number of datastores of related data.

FIG. 3A illustrates an initial Data Migration Priority Map (DMPM) 310 in accordance with an embodiment. As noted above, in one embodiment the initial DMPM 310 is created prior to beginning the data migration process as a result of an analysis of the historical data access pattern of the source data volume during operation of the source application over a period of time in the source computing environment. In some embodiments, the source data volume is divided into a number of chunks based on a predefined chunk size specified by an IT administrator and the size of the source data volume. For purposes of simplicity, in the context of the present example, it is assumed the predefined chunk size is 1,000 blocks and the size of the source data volume is 10,000 blocks. As such, the source data volume has been divided into 10 chunks of 1,000 blocks.

In the context of the present example, for each chunk, the initial DMPM 310 includes a chunk ID 311, a priority 312, a start block 313, an end block 314, and a migrated flag 315 (e.g., true or false/yes or no) or migration status indicative of the state of migration of the chunk (e.g., migrated, not migrated, migration in-process). In one embodiment, the priority 312 values are assigned to the chunks with the intention of causing those of the chunks that are relatively more likely to be used to be migrated to the target data volume prior to those that are relatively less likely to be used. By migrating those chunks having a higher likelihood of being used first, data misses (e.g., attempts to access data that has not yet been migrated to the target data volume) at the target computing environment are expected to be minimized, which results in reduced latency of live requests during concurrent operation of the migrated application and performance of background data migration.

As the data usage pattern may change over time, according to one embodiment, the priority 312 for the chunks are capable of being altered dynamically during operation of the migrated application (e.g., application 121) based on currently observed data access patterns. So, in some embodiments, a priority map used to drive the background data migration process may be based upon both historical data access patterns as well as currently observed data access patterns to intelligently determine the order of chunk migration. Additionally, as noted above, as the migrated application is operational during the background data migration process, it may also be desirable to trigger migration of a particular chunk on a prioritized basis due to one of more of its associated blocks being the subject of a user request.

FIG. 3B illustrates a DMPM 350 after data migration for a stateful application has commenced and the DMPM 350 has been updated to reflect observed data usage patterns in accordance with an embodiment. In the context of the present example, those of the priorities 312 and migrated flags 315 that have been updated during operation of the migrated application (e.g., application 121) are highlighted with a grey background. For example, the migrated flag 315 of chunk IDs 2, 4, 6, and 7 indicates the migration for the blocks associated with these chunks has now been completed. Additionally, the priority 312 of chunk ID 6 has increased from a value of 80 to a value of 90 and the priority 312 of chunk 10 has decreased from a value of 43 to a value of 11, indicating a change in data usage patterns for these chunks as compared to the historical data access pattern.

While in the context of FIGS. 3A and 3B, a migration flag having two states is shown, in alternative embodiments, it may be helpful to also have an "in-process" status. In such an embodiment, rather than using a migration flag, a three state migration status could be used indicating whether the cluster at issue has been migrated, has not been migrated or is in-process.

The processing described below with reference to the flow diagrams of FIGS. 4-9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 10 below.

While for sake of brevity, certain actions may be described with reference to the flow diagrams of FIGS. 4-9 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 4:
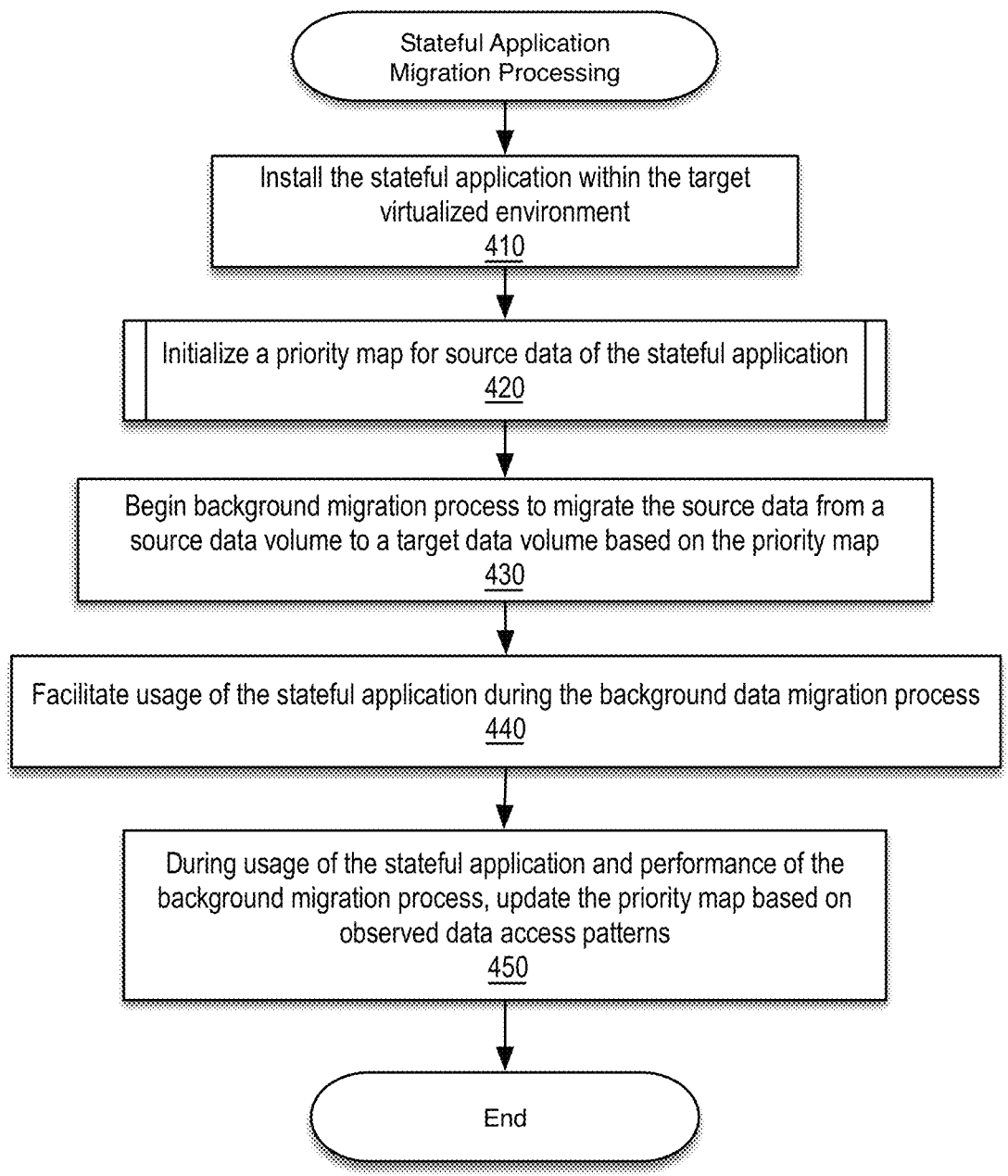
FIG. 4 is a high-level flow diagram illustrating stateful application migration processing in accordance with an embodiment.

FIG. 4 is a high-level flow diagram illustrating stateful application migration processing in accordance with an embodiment. At block 410, the stateful application is installed within the target virtualized environment. According to one embodiment, this may involve creation of the application topology template 236 and provisioning of the application topology. In one embodiment, an API endpoint of the target virtualized environment specified by the IT administrator (e.g., IT administrator 201) during registration of information associated the stateful application may be used to create an instance of the stateful application within the target virtualized environment. For example, responsive to receipt of a request from the stateful application migration engine 230 initiated by the IT administrator, the application compute instance migrator 233 may cause an instance of the migrated application to be created within the target virtualized computational environment (e.g., target computational environment 120) by invoking the API endpoint retrieved from the application registry 211.

At block 420, a priority map used to order the migration of source data upon which the application depends is initialized. According to one embodiment, a historical data access pattern indicative of the frequency of use of the data blocks of the source data volume may be analyzed to create the initial DMPM 232 by assigning priority values to each chunk of the source data volume. For example, higher priority values may be assigned to chunks including data blocks that are more frequently used. In this manner, the background data migration process, which is driven by the priority map (which may be dynamically altered over time as discussed further below), may give precedence to migration of those of the chunks that are more likely to be used during operation of the application. An example of the processing that may be performed to create an initial priority map (e.g., the initial DMPM 232) is described below with reference to FIG. 5.

At block 430, a background data migration process is started to migrate the source data from a source data volume (e.g., iSCSI volume 112) to a target data volume (e.g., block storage 122) based on the priority map. According to one embodiment, the background data migration process is performed by the data migration manger 260. An example of the background processing that may be performed to migrate the source data volume on a chunk-by-chunk basis in a prioritized manner is described further below with reference to FIG. 9.

At block 440, usage of the stateful application by end users concurrently with the background data migration process is facilitated. In this manner, usage of the stateful application in the target computing environment to which it has been migrated need not be delayed until of the migration of the source data upon which it relies has been completed. According to one embodiment, the current physical location of the chunks of the source data are abstracted from the stateful application by tracking within the priority map information indicative of the migration status of each chunk of the source data and logically interposing a dummy volume (e.g., dummy volume 250) between the stateful application and the physical location of the data (which depending upon its current migration status may be (i) the source data volume in the source computing environment, (ii) the target data volume in the target computing environment, or (ii) uncertain as a result of the migration of the data at issue being in process).

At block 450, during concurrent usage of the stateful application and performance of the background data mitigation process, the priority map is dynamically updated based on observed data access patterns. According to one embodiment, the priority map is periodically updated by performing a background process that evaluates emerging data access patterns based on current usage of the stateful application. For example, the data migration manger 260, as a result of it being in the path of all read and write requests issued by the stateful application, is able to observe potential changes as compared with the historical data access pattern and may accordingly revise the priority values associated with chunks that are being more or less frequently accessed. An example of the background processing that may be performed to update the priority map (e.g., local DMPM 232) locally maintained within the target computing environment is described further below with reference to FIG. 9.

Figure 5:
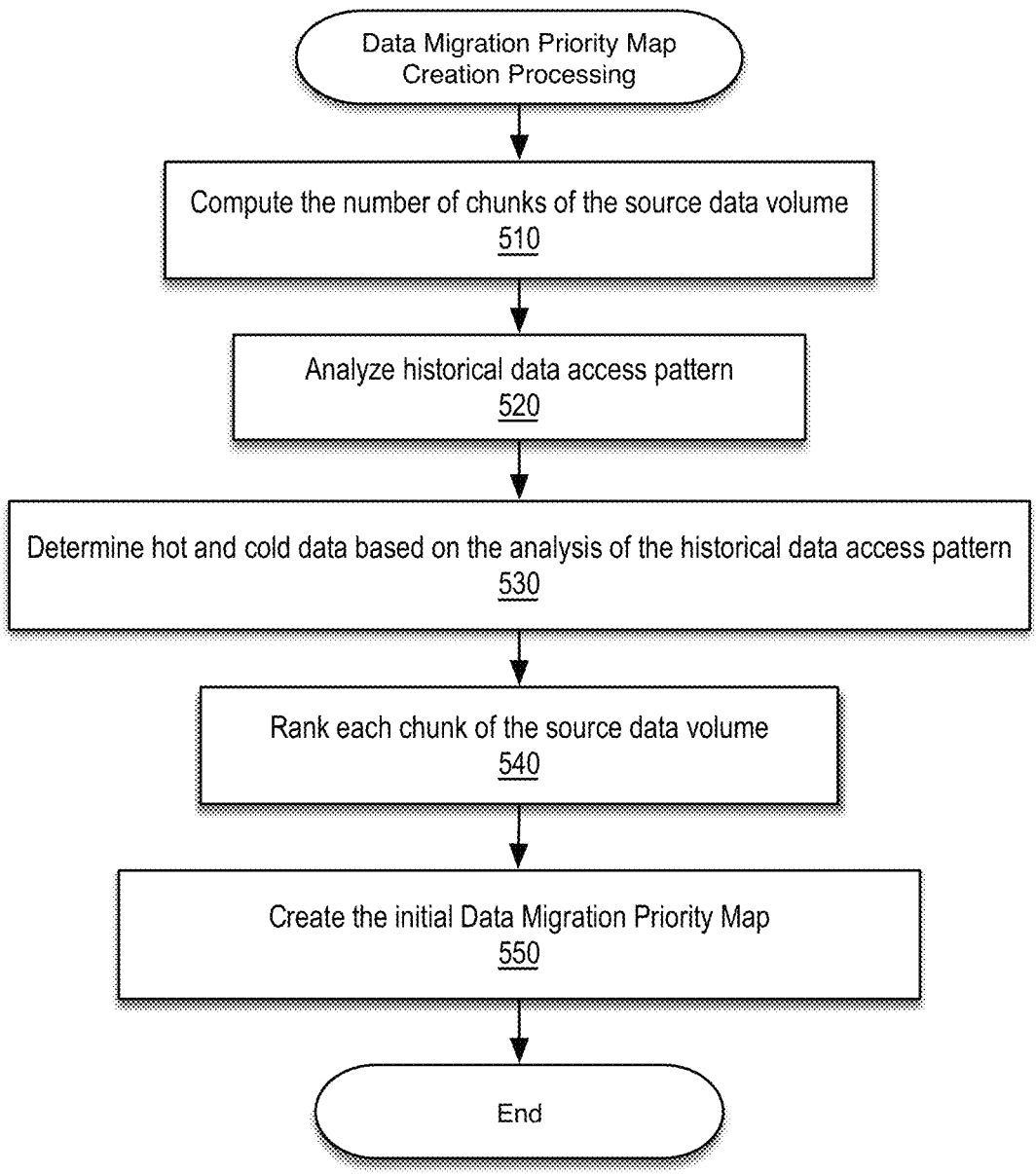
FIG. 5 is a flow diagram illustrating DMPM creation processing in accordance with an embodiment.

FIG. 5 is a flow diagram illustrating DMPM creation processing in accordance with an embodiment. According to one embodiment, this DMPM creation processing is triggered responsive to a request by the IT administrator to initiate the migration process issued to the stateful application migration engine 230, which invokes the historical data access pattern analyzer 231.

At block 510, the number of chunks of the source data volume are computed. In one embodiment, the number of chunks is based on a predefined chunk size selected by the IT administrator controlling the application migration process and the size of the source data volume. In such an embodiment, the migration configuration and administrator specified preferences may be retrieved from the application registry data store 211. Additionally or alternatively, the system may programmatically determine the chunk size or provide the IT administrator with guidance regarding an appropriate chunk size based on various factors, including, but not limited to characteristics of the source application (e.g., observed IOPS and observed MBPS), available network bandwidth between the source computational environment and the target computational environment, size limitations associated with the priority maps, and/or historical usage behavior of end users interacting with the source application. In one embodiment, information regarding one or more of these characteristics may be retrieved form the historical data access pattern data store 240.

At block 520, previously collected information regarding the historical data access pattern associated with the source data volume is analyzed. In one embodiment, prior to starting the application migration process, the system may observe data access patterns (in terms of spatial and/or temporal frequency) associated with data blocks of the source data volume over a period of time. In one embodiment, the information collected as a result of these observations over time represents the historical data access pattern that is analyzed.

At block 530, based on the analysis performed in block 520, a determination can be made regarding which portions of the data in the source data volume are hot (e.g., more frequently accessed) and which are cold (less frequently accessed).

At block 540, each chunk of the source data volume is ranked to designate its relative priority in connection with the background data migration process. For example, a chunk having one or more hot data blocks may be prioritized so as to be migrated from the source data volume to the target data volume before a chunk having all cold data blocks.

At block 550, the initial DMPM is created based on the analysis and ranking described above.

Figure 6:
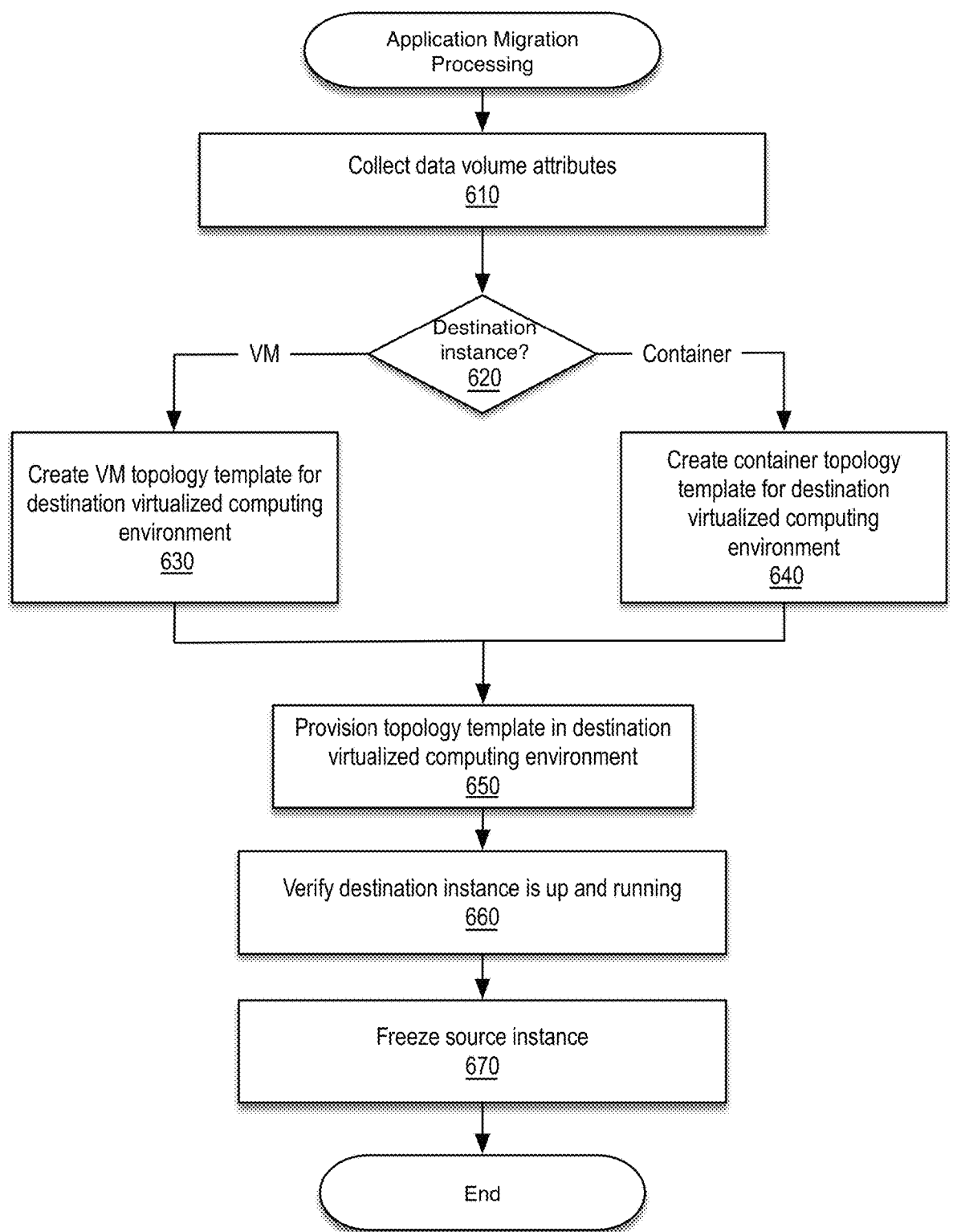
FIG. 6 is a flow diagram illustrating application migration processing in accordance with an embodiment.

FIG. 6 is a flow diagram illustrating application migration processing in accordance with an embodiment. According to one embodiment, this application migration processing is triggered responsive to a request by the IT administrator to initiate the migration process issued to the stateful application migration engine 230, which invokes the application compute instance migrator 233.

At block 610, target data volume attributes are collected. In one embodiment, this information has previously been stored within the application registry 211 as a result of the IT administrator registering application migration attributes via the application registry manager 210. In such an embodiment, the target data volume attributes may be retrieved from the application registry database 211.

At decision block 620, a determination is made regarding the type of the target (destination) application instance. Depending upon the particular implementation, migration can be facilitated from a source application in the form of a VM-based application to a target application in the form of container-based application, from a VM-based application to a VM-based application, or from a container-based application to a container based application. When the destination instance is VM, processing continues with block 630 at which a VM topology template is created for the destination virtualized computing environment; otherwise, when the destination instance is container, processing branches to block 640 at which a container topology template is created for the destination computing environment.

According to one embodiment, the provisioning template (e.g., the VM topology template or the container topology template) captures a specification of resources for use by the cloud infrastructure service controller. For example, in the context of AWS, the provisioning template may represent a CloudFormation template, which captures details of application image, persistent volume details, application configuration attributes, etc.

At block 650, the topology template created in block 630 or 640 is provisioned within the destination virtualized computing environment to create the destination application instance.

At block 660, the destination application instance is verified as being up and running. According to one embodiment, a validation test suite may be used to exercise a dummy request, for example, to the newly deployed application and confirm the response is as expected.

At block 670, assuming the destination application instance is operational, the source application instance is frozen to preclude further interactions with this instance. For example, the source instance can be marked as being in a frozen state (e.g., an inactive mode) so no new user requests will be accepted by this instance of the application.

Figure 7:
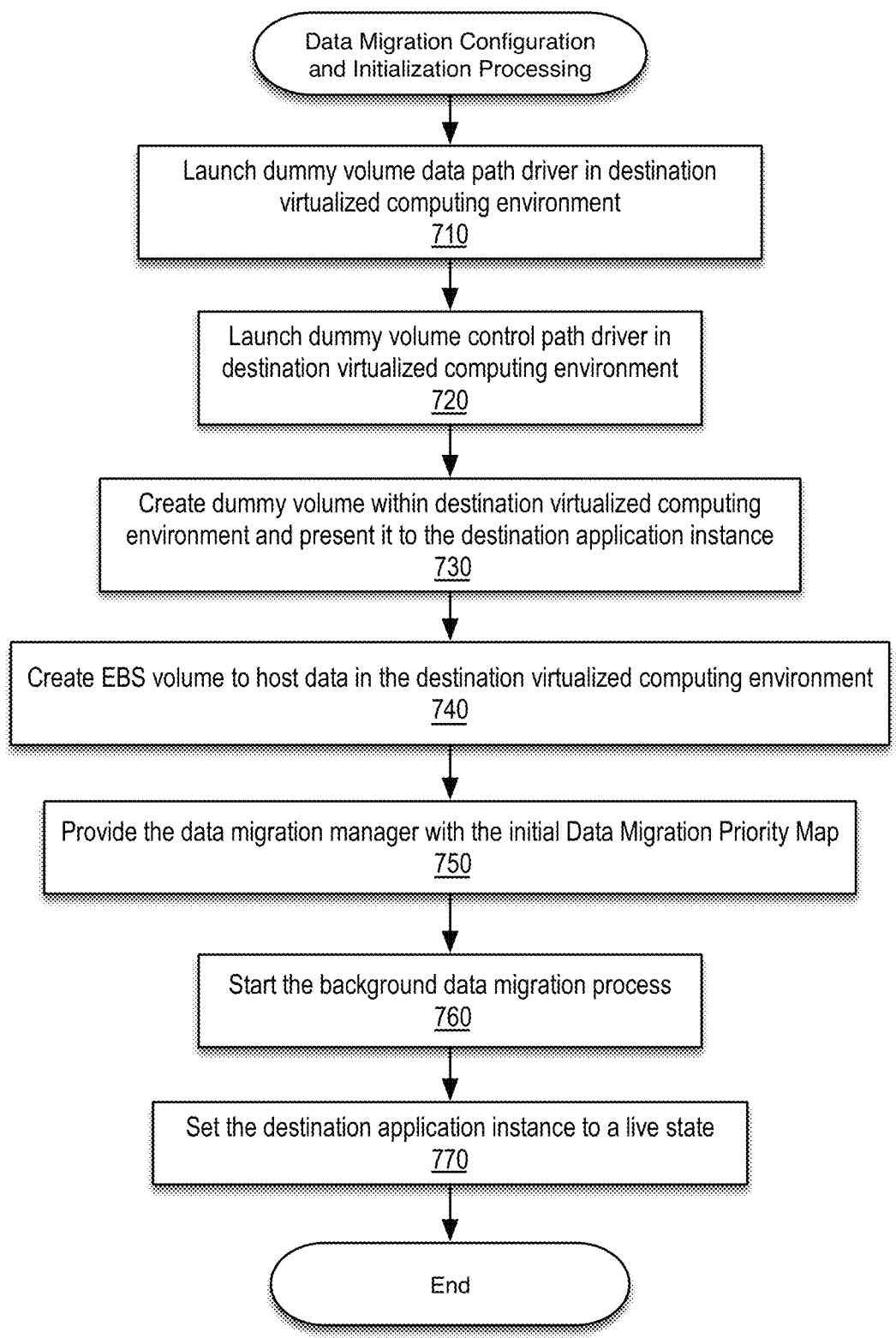
FIG. 7 is a flow diagram illustrating data migration configuration and initialization processing in accordance with an embodiment.

FIG. 7 is a flow diagram illustrating data migration configuration and initialization processing in accordance with an embodiment. According to one embodiment, this data migration configuration and initialization processing is triggered responsive to a request by the stateful application migration engine 230 to the application configuration engine 234 to set up the migration ecosystem. In one embodiment, this setting up of the migration ecosystem involves creation of a set of entities/components in the destination virtualized computing environment that will participate in the migration workflow.

At block 720, a dummy volume data path driver is launched in the destination virtualized computing environment. According to one embodiment, the dummy volume data path driver represents a device driver of a dummy volume (e.g., a zero-sized volume) that is presented to the destination instance of the application to facilitate interception of read/write requests issued by the application and redirection of such requests to the data migration manager 260 for processing. In this manner, the dummy volume data path driver acts as a proxy between the application and the data migration manger.

At block 730, the dummy volume is created within the destination virtualized computing environment and is presented to the destination application instance. According to one embodiment, the dummy volume control path driver 252 presents the dummy volume to the application as a block device to cause any I/O performed by the application to be routed to the dummy volume data path driver 251.

At block 740, a block storage volume (e.g., block storage 122) is created to host data in the destination virtualized computing environment.

At block 750, the data migration manger is launched and provided with an initial priority map indicative of the relative priorities of the chunks of the source data volume. According to one embodiment, the application configuration engine 234 provides the data migration manager 260 with the initial DMPM 232 created by the historical data access pattern analyzer 231.

At block 760 the background data migration process is started to begin replicating the source data on a chunk-by-chunk basis in accordance with the chunk priorities specified in the priority map. According to one embodiment, the background data migration process is one of two background jobs run at different frequencies by the data migration manager 260 until migration of all of the data in the source data volume has been completed.

At block 770, the destination application instance is set to a live state (e.g., an active mode) to enable it to start accepting requests from end users. In one embodiment, the destination application instance accepts requests from end users concurrently with the performance of the background data migration process. That is, the destination application instance is essentially immediately operational and available for use by end users as soon as the computational instance of the source application instance has been migrated despite the fact that not all of the data upon which it relies has been migrated to the destination data volume within the destination computational environment.

Figure 8:
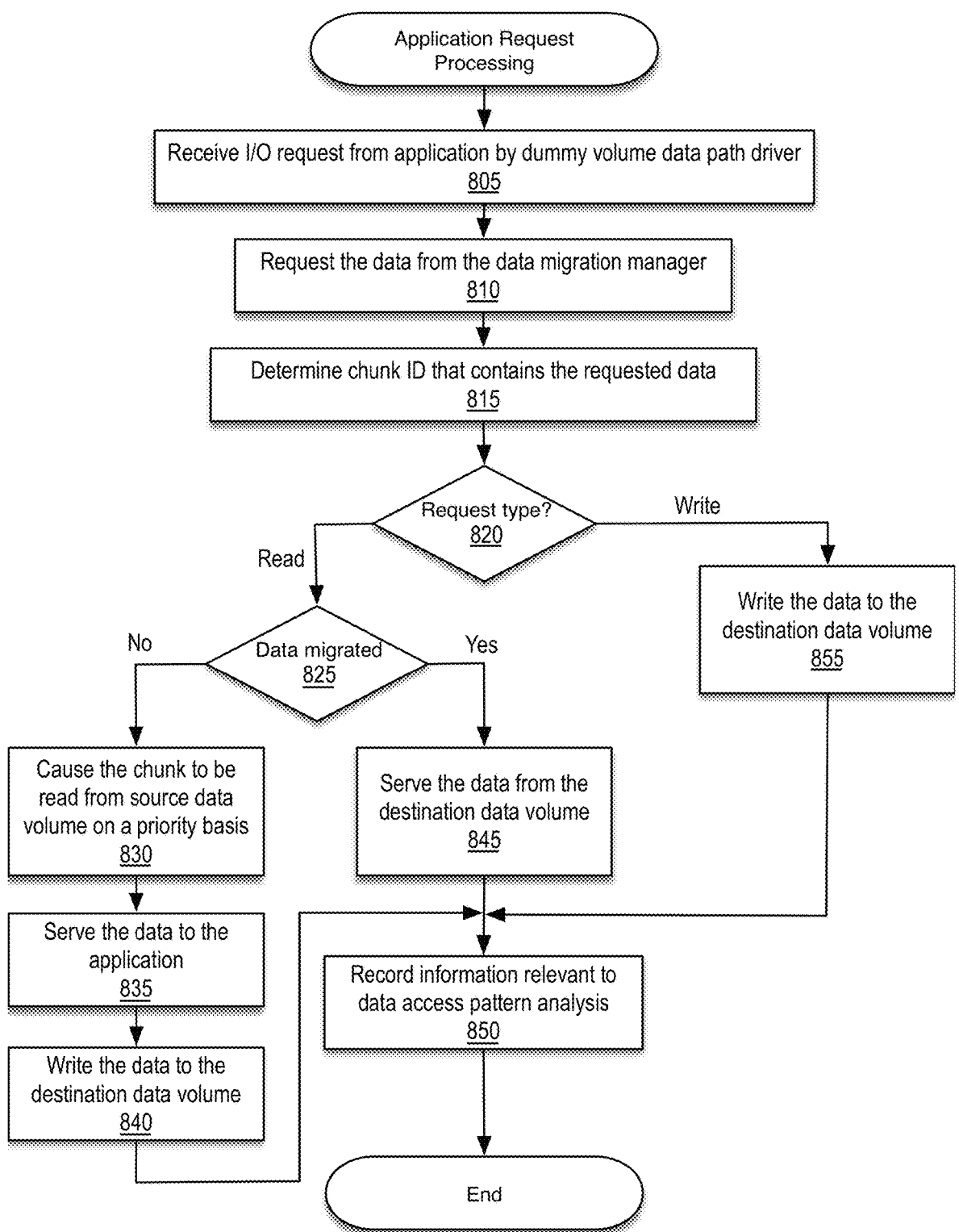
FIG. 8 is a flow diagram illustrating application request processing in accordance with an embodiment.

FIG. 8 is a flow diagram illustrating application request processing in accordance with an embodiment. According to one embodiment, this application request processing facilitates serving of application requests while data migration is ongoing.

At block 805, an I/O request is received from the destination application instance (e.g., application 121) by the dummy volume data path driver. According to one embodiment, the received I/O request is triggered responsive to a request by an application user interacting with the application, which causes the application to perform an I/O operation on the dummy volume.

At block 810, the data is requested from the data migration manger. According to one embodiment, the dummy volume data path driver determines a set of data blocks associated with the request and issues a request for the set of data blocks to the data migration manger.

At block 815, the chunk ID containing the requested data is determined. For example, the data migration manger may identify the chunk containing the requested set of data blocks.

At decision block 820, a determination is made regarding the type of the I/O request at issue. When the I/O request is a read, processing continues with decision block 825; otherwise, when the I/O request is a write, processing branches to block 855.

At decision block 825, it is determined whether the requested data has been migrated. If so, processing continues with block 845; otherwise, processing branches to block 830. According to one embodiment, this determination is made by the data migration manager 250 with reference to the local DMPM 261 based on the migration flag associated with the chunk ID.

At block 830, it has been determined that the requested data has not yet been migrated to target data volume; therefore, in the context of the present example, the chunk containing the requested data is caused to be retrieved from the source data volume on a priority basis so as to reduce latency. According to one embodiment, this is accomplished by increasing the priority value of the chunk within the local DMPM 261, to a priority value greater than all other chunks that have yet to be migrated. As a result, during the next periodic run of the background data migration process, migration of the chunk containing the requested data will commence.

At block 835, the data is served to the destination application instance. According to one embodiment, when the data is retrieved from the source data volume it is cached within the destination computing environment. As such, in one embodiment, responsive to receipt of the data into the cache, the data can be retrieved from the cache by the data migration manager 260, returned to the dummy volume data path drive 251 and served by the dummy volume data path driver 251 to the application 121.

At block 840, the newly received set of blocks from the source data volume is written to the destination data volume (e.g., the block storage 122). For example, the dummy volume data path driver 251 may direct the data migration manger 260 to flush the newly received set of blocks residing in the cache to the destination data volume. After the data has been written to the destination data volume processing continues with block 860.

At block 845, it has been determined that the requested data has been migrated to the destination data volume; therefore, in the context of the present example, the requested data may be served from the destination data volume. For example, the data migration manager 260 may retrieve the requested data from the block storage 122, the data migration manger 260 may return the requested data to the dummy volume data path driver 251, and the dummy volume data path driver 251 may return the requested data to the application 121. In the context of the present example, at this point, processing continues with block 850.

At block 855, it was previously determined at decision block 820 that the request at issue is a write request. According to one embodiment, the data is therefore written to the destination data volume.

At block 850, information relevant to data access pattern analysis is recorded for future reference. According to one embodiment, the data migration manager 260 persists data regarding the current time, the type of request and the set of data blocks associated with the request. The data migration manager 260 may also increment read or write counters and/or counters indicative of the number of times a particular data block has been accessed during a particular time interval (e.g., the time interval associated with the periodic reevaluation of data access patterns). In one embodiment, as described further below with reference to FIG. 9, on a periodic basis this stored data relating to observations regarding data access patterns reflecting post migration usage of data by the destination application instance may then be analyzed.

Figure 9:
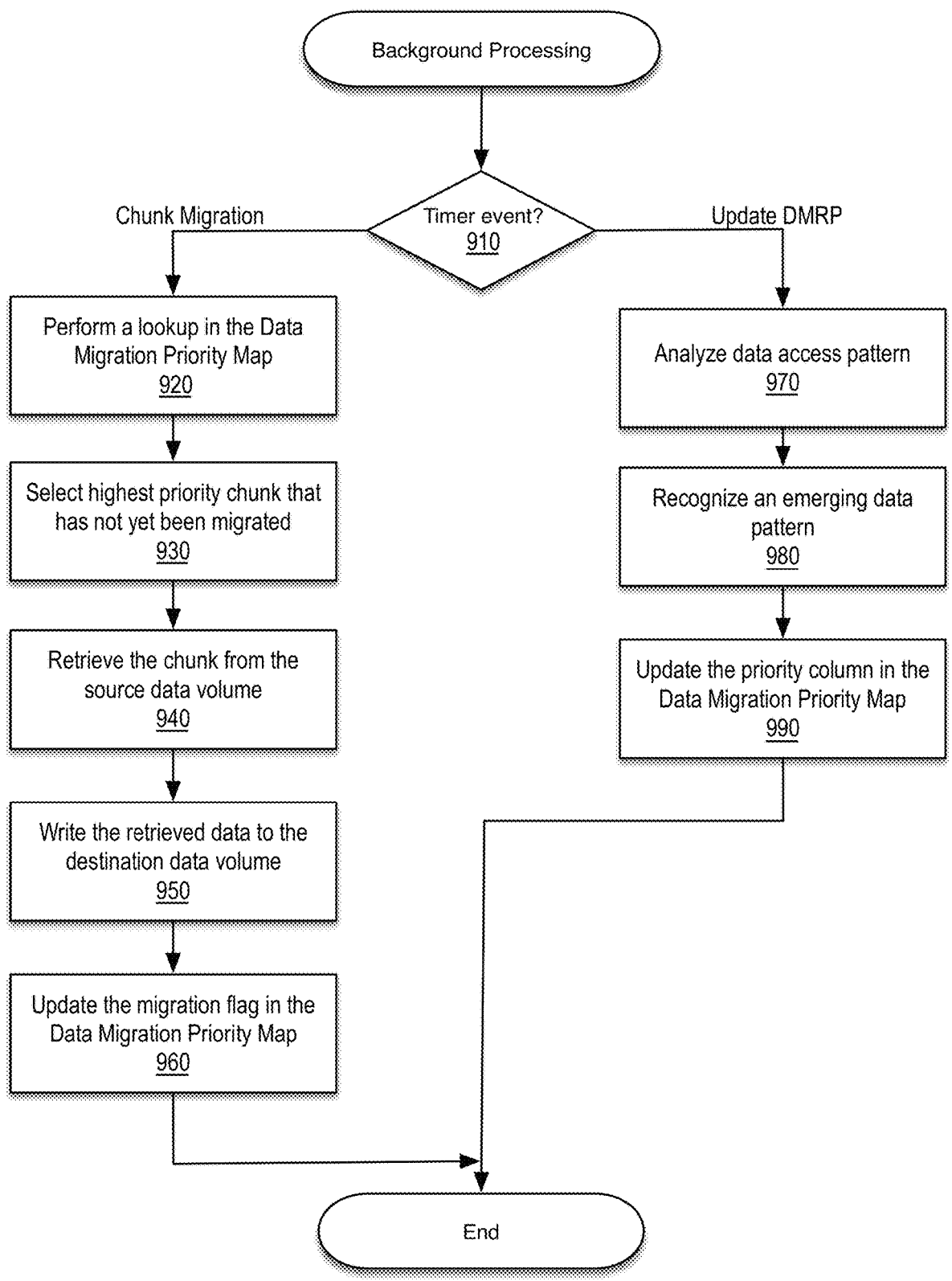
FIG. 9 is a flow diagram illustrating background processing in accordance with an embodiment.

FIG. 9 is a flow diagram illustrating background processing in accordance with an embodiment. According to one embodiment, this background processing is performed by two separate background jobs being run by the data migration manger 260 at different frequencies. In one embodiment, the chunk migration is performed at a higher frequency than the DMPM updating. In one embodiment, the frequency of the chunk migration is selected so as to avoid significantly impacting the performance of the destination application instance (e.g., application 121). For example, in one embodiment, the chunk migration background process beginning at block 920 can be configured by the administrator, who ultimately decides how fast the data is to be migrated based on nature of transactions being performed by the application. An application that mostly relies on new data, for example, might be configured to migrate data slowly. With respect to the background DMRP update processing beginning at block 970, it may be scheduled to run every one to five hours, for example, or in accordance with a configuration parameter. In general the period for updating the DMRP should be long enough to allow observation of a sufficient number of user requests based on which intelligent learning can be made.

In one embodiment, these two background jobs run until the migration of all of data from the source data volume to the target data volume has been completed.

At decision block 910, responsive to a timer event it is determined which of two background processes is to be performed. When the timer event relates to chunk migration, processing continues with block 920; otherwise, when the timer event indicates it is time to update the DMPM, processing branches to block 970.

At block 920, a look up is performed in the local DMPM 261.

At block 930, the highest priory chunk of the chunks that have not yet been migrated is selected as the next chunk to be migrated. In one embodiment, the administrator may be able to configure a parameter defining a maximum number of chunks that can be in the process of being migrated at once.

At block 940, the selected chunk is retrieved from the source data volume.

At block 950, responsive to receipt of the retrieved data, it is written to the destination data volume.

At block 960, the migration flag is updated in the local DMPM 261 to mark the chunk as migrated.

At block 970, the post application migration data access pattern is analyzed. For example, in one embodiment, the data captured responsive to application request processing and recorded in block 850 of FIG. 8 is retrieved and analyzed.

At block 980, based on the analysis performed at bock 970 an emerging data pattern may be identified when the observed post migration usage data differs sufficiently from the historical data access pattern to warrant a change to one or more priority values of chunks in the local DMPM 261. In this manner, the priority values in the local DMPM 261 may be dynamically modified for chunks that have yet to be migrated to adjust to the emergence of a new data pattern post application migration.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 10:
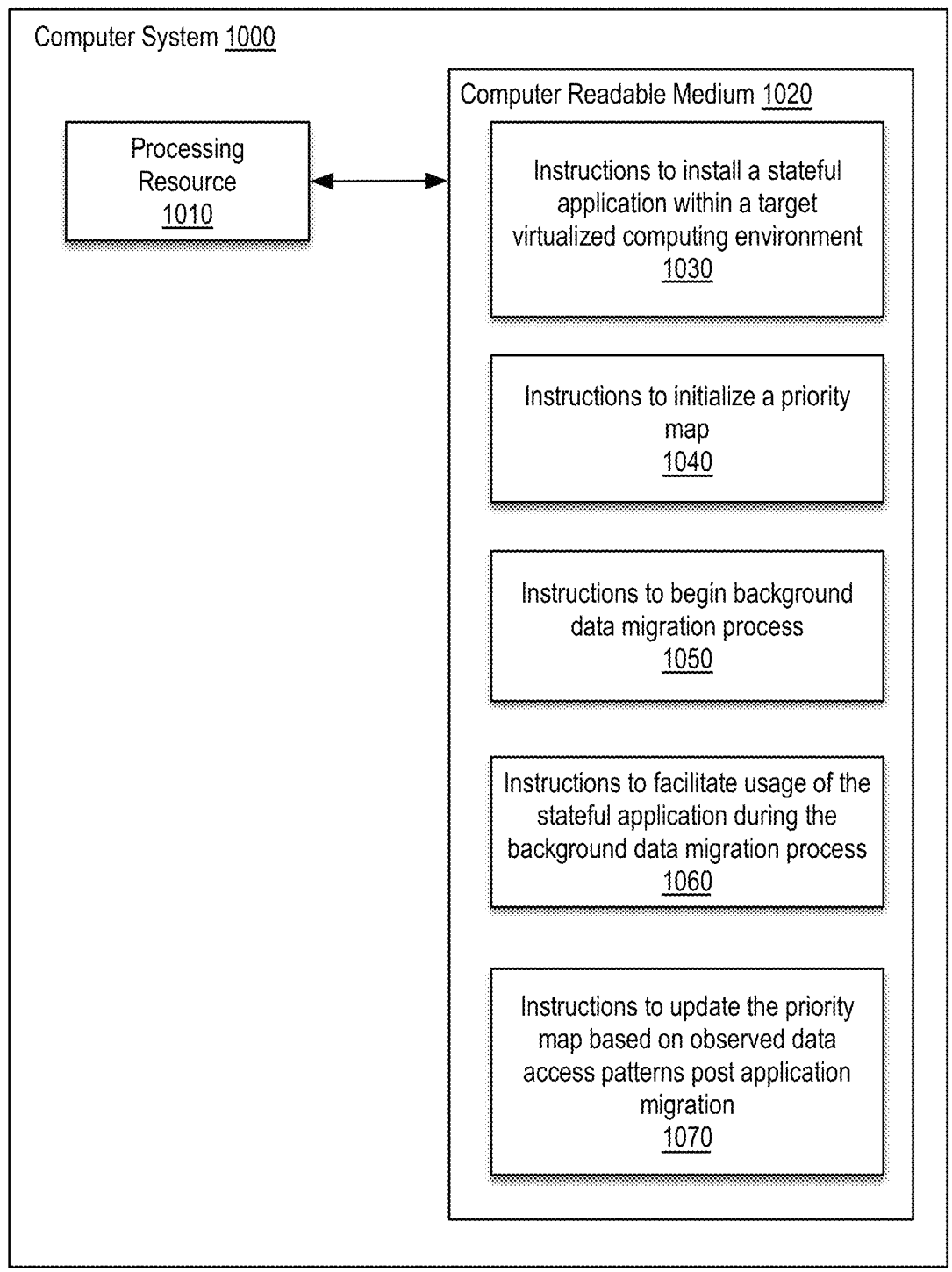
FIG. 10 is a block diagram of a computer system in accordance with an embodiment.

FIG. 10 is a block diagram of a computer system in accordance with an embodiment. In the example illustrated by FIG. 10, computer system 1000 includes a processing resource 1010 coupled to a non-transitory, machine readable medium 1020 encoded with instructions to perform a proactive auto-scaling method in accordance with a private cloud embodiment. The processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000. Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1070. It should be understood that part or all of the executable instructions and/or electronic circuits included within one block may, in alternate implementations, be included in a different block shown in the figures or in a different block not shown.

Instructions 1030, upon execution, cause the processing resource 1010 to install a stateful application within a target virtualized computing environment. In one embodiment, instructions 1030 may correspond generally to instructions for performing block 410 of FIG. 4.

Instructions 1040, upon execution, cause the processing resource 1010 to initialize a priority map. In one embodiment, instructions 1040 may correspond generally to instructions for performing block 420 of FIG. 4.

Instructions 1050, upon execution, cause the processing resource 1010 to begin a background data migration process. In one embodiment, instructions 1050 may correspond generally to instructions for performing block 430 of FIG. 4.

Instructions 1060, upon execution, cause the processing resource 1010 to facilitate usage of the stateful application during the background data migration process. In one embodiment, instructions 1060 may correspond generally to instructions for performing block 440 of FIG. 4.

Instructions 1070, upon execution, cause the processing resource 1010 to update the priority map based on observed data access patterns post application migration. In one embodiment, instructions 1060 may correspond generally to instructions for performing block 450 of FIG. 4.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method of migrating a stateful application from a first computing environment to a target virtualized environment, the method comprising:
   installing an instance of the stateful application within the target virtualized environment;
   initializing a priority map for source data associated with the stateful application by establishing a priority for each chunk of a plurality of chunks of the source data by analyzing historical data frequency access patterns associated with the source data, wherein each chunk of the plurality of chunks has a chunk size indicative of a plurality of data blocks and wherein the chunk size is set based on a characteristic of the stateful application;
   migrating the source data from a source data volume associated with the first computing environment to a target data volume associated with the target virtualized environment on a chunk-by-chunk basis by performing a background data migration process based on the priority map;
   facilitating usage of the stateful application during the background data migration process by;
      abstracting from the stateful application a current location of a particular chunk of the plurality of chunks that is being operated upon by the stateful application; and
      maintaining for each chunk of the plurality of chunks information regarding a migration status of the chunk; and
      during usage of the stateful application and performance of the background data migration process, updating the priority map to reflect a change in observed data frequency access patterns from the historical data frequency access patterns.

2. The computer-implemented method of claim 1, wherein said abstracting a current location of a particular chunk comprises presenting a dummy volume to the stateful application as a block device.

3. The computer-implemented method of claim 2, wherein the dummy volume comprises a zero-sized storage volume.

4. The computer-implemented method of claim 2, further comprising:
   receiving, by a device driver associated with the dummy volume, from the stateful application a read operation associated with the particular chunk;
   requesting, by the device driver, data associated with the particular chunk from a data mitigation manager responsible for performing the background data migration process and said updating the priority map;
   determining, by the data mitigation manager, based on the information regarding the migration status of the particular chunk whether migration of the particular chunk has been completed, is in process, or has not been completed;
   when the migration of the particular chunk is determined to have been completed, providing the device driver with the data by retrieving it from the target data volume;
   when the migration of the particular chunk is determined to be in process, responsive to completion of the migration of the particular chunk, returning the data to the device driver; and
   when the migration of the particular chunk is determined not to have been completed:
      initiating migration of the particular chunk by raising the priority of the particular chunk in the priority map; and
      responsive to completion of the migration of the particular chunk, returning the data to the device driver.

5. The computer-implemented method of claim 2, further comprising responsive to completion of the background data migration process, redirecting the stateful application from the dummy volume to the target data volume.

6. The computer-implemented method of claim 4, wherein any difference between storage protocols implemented by the source data volume and the target data volume are handled by the data migration process by reading the data from the source data volume using a first storage protocol implemented by the source data volume and writing the data to the target data volume using a second storage protocol implemented by the target data volume.

7. The computer-implemented method of claim 1, wherein the priority for a given chunk of the plurality of chunks is indicative of a relative likelihood of use by the stateful application of one or more data blocks within the given chunk.

8. The computer-implemented method of claim 1, wherein the characteristic comprises a measure of a frequency of input/output (I/O) operations performed by the stateful application per unit of time, a measure of an amount of data transferred by the stateful application per unit of time, or a measure of a size of the I/O operations performed by the stateful application.

9. A non-transitory machine readable medium storing instructions executable by a processing resource of a computer system, the non-transitory machine readable medium comprising instructions to:
install an instance of the stateful application within the target virtualized environment;
initialize a priority map for source data associated with the stateful application by establishing a priority for each chunk of a plurality of chunks of the source data by analyzing historical data frequency access patterns associated with the source data, wherein each chunk of the plurality of chunks has a chunk size indicative of a plurality of data blocks and wherein the chunk size is set based on a characteristic of the stateful application;
migrate the source data from a source data volume associated with the first computing environment to a target data volume associated with the target virtualized environment on a chunk-by-chunk basis by performing a background data migration process based on the priority map;
facilitate usage of the stateful application concurrent with the background data migration process by:
abstracting from the stateful application a current location of a particular chunk of the plurality of chunks that is being operated upon by the stateful application; and
maintaining for each chunk of the plurality of chunks information regarding a migration status of the chunk; and
during usage of the stateful application and performance of the background data migration process, periodically update the priority map based on observed data frequency access patterns associated with the usage of the stateful application.

10. The non-transitory machine readable medium of claim 9, wherein the current location of the particular chunk is abstracted by presenting a dummy volume to the stateful application as a block device.

11. The non-transitory machine readable medium of claim 10, wherein the dummy volume comprises a zero-sized storage volume.

12. The non-transitory machine readable medium of claim 10, further comprising instructions to responsive to completion of the background data migration process, redirect the stateful application from the dummy volume to the target data volume.

13. The non-transitory machine readable medium of claim 9, wherein the priority for a given chunk of the plurality of chunks is indicative of a relative likelihood of use by the stateful application of one or more data blocks within the given chunk.

14. The non-transitory machine readable medium of claim 9, wherein the characteristic comprises a measure of a frequency of input/output (I/O) operations performed by the stateful application per unit of time, a measure of an amount of data transferred by the stateful application per unit of time, or a measure of a size of the I/O operations performed by the stateful application.

15. The non-transitory machine readable medium of claim 10, further comprising instructions to:
receive, by a device driver associated with the dummy volume, from the stateful application a read operation associated with the particular chunk;
request, by the device driver, data associated with the particular chunk from a data mitigation manager responsible for performing the background data migration process and updating the priority map;
determine, by the data mitigation manager, based on the information regarding the migration status of the particular chunk whether migration of the particular chunk has been completed, is in process, or has not been completed;
when the migration of the particular chunk is determined to have been completed, provide the device driver with the data by retrieving it from the target data volume;
when the migration of the particular chunk is determined to be in process, responsive to completion of the migration of the particular chunk, return the data to the device driver; and
when the migration of the particular chunk is determined not to have been completed:
initiate migration of the particular chunk by raising the priority of the particular chunk in the priority map; and
responsive to completion of the migration of the particular chunk, return the data to the device driver.

16. The non-transitory machine readable medium of claim 15, wherein any difference between storage protocols implemented by the source data volume and the target data volume are handled by the data migration process by reading the data from the source data volume using a first storage protocol implemented by the source data volume and writing the data to the target data volume using a second storage protocol implemented by the target data volume.

17. A system comprising:
a processing resource; and
a non-transitory computer-readable medium, coupled to the processing resource, having stored therein instructions that when executed by the processing resource cause the processing resource to:
install an instance of the stateful application within the target virtualized environment;
initialize a priority map for source data associated with the stateful application by establishing a priority for each chunk of a plurality of chunks of the source data by analyzing historical data frequency access patterns associated with the source data, wherein each chunk of the plurality of chunks has a chunk size indicative of a plurality of data blocks and wherein the chunk size is set based on a characteristic of the stateful application;
migrate the source data from a source data volume associated with the first computing environment to a target data volume associated with the target virtualized environment on a chunk-by-chunk basis by performing a background data migration process based on the priority map;
facilitate usage of the stateful application concurrent with the background data migration process by;
abstracting from the stateful application a current location of a particular chunk of the plurality of chunks that is being operated upon by the stateful application; and
maintaining for each chunk of the plurality of chunks information regarding a migration status of the chunk; and
during usage of the stateful application and performance of the background data migration process, periodically update the priority map based on observed data frequency access patterns associated with the usage of the stateful application.

18. The system of claim 17, wherein the current location of the particular chunk is abstracted by presenting a dummy volume to the stateful application as a block device.

19. The system of claim 18, wherein the dummy volume comprises a zero-sized storage volume.

20. The system of claim 18, wherein the instructions further cause the processing resource to:
receive, by a device driver associated with the dummy volume, from the stateful application a read operation associated with the particular chunk;
request, by the device driver, data associated with the particular chunk from a data mitigation manager responsible for performing the background data migration process and updating the priority map;
determine, by the data mitigation manager, based on the information regarding the migration status of the particular chunk whether migration of the particular chunk has been completed, is in process, or has not been completed;
when the migration of the particular chunk is determined to have been completed, provide the device driver with the data by retrieving it from the target data volume;
when the migration of the particular chunk is determined to be in process, responsive to completion of the migration of the particular chunk, return the data to the device driver; and
when the migration of the particular chunk is determined not to have been completed:
initiate migration of the particular chunk by raising the priority of the particular chunk in the priority map; and
responsive to completion of the migration of the particular chunk, return the data to the device driver.

21. The system of claim 18, wherein the instructions further cause the processing resource to responsive to completion of the background data migration process, redirect the stateful application from the dummy volume to the target data volume.

22. The system of claim 17, wherein the priority for a given chunk of the plurality of chunks is indicative of a relative likelihood of use by the stateful application of one or more data blocks within the given chunk.

23. The system of claim 17, wherein the characteristic comprises a measure of a frequency of input/output (I/O) operations performed by the stateful application per unit of time, a measure of an amount of data transferred by the stateful application per unit of time, or a measure of a size of the I/O operations performed by the stateful application.

* * * * *